United States Patent Office.

WILLIAM K. BOYLE, OF BLADENSBURG, MARYLAND.

*Letters Patent No.* 82,202, *dated September* 15, 1868; *antedated September* 7, 1868; *reissue No.* 3,151, *dated October* 6, 1868.

IMPROVEMENT IN THE MANUFACTURE OF ARTIFICIAL STONE.

The Schedule referred to in these Letters Patent and making part of the same.

TO ALL WHOM IT MAY CONCERN:

Be it known that I, WILLIAM K. BOYLE, of Bladensburg, in the county of Prince George, and State of Maryland, have invented a new and useful Improvement in the Manufacture of Artificial Stone; and I do hereby declare the following a distinct description of the ingredients and of the process of preparing and compounding the same.

My invention relates to the formation of artificial stone by the use of either the silicate of potash or soda, in combination with sand, gravel, or any other insoluble earthy material, for forming the mass or body of the stone, and subsequently submitting the mass thus formed to the action of a solution of nitrate of lime, whereby, by virtue of their chemical affinities, the insoluble silicate of lime is formed throughout the mass, constituting the cementing property thereof, after which the nitrate of potassa, the second product of the above-mentioned interchange in the stone, is to be washed out by water, and, together with whatever of said salt may remain in the bath, to be utilized by chemical treatment and evaporation and chrystallization, as hereinafter described, to form commercial saltpetre. In case silicate of soda be used, the resulting second product, the nitrate of soda to be treated in the same way as the potassa salt.

*Process.*

Mix intimately with well-dried sand, gravel, clay, or any other insoluble earthy substance, a sufficient quantity of the soluble silicates of potassa or soda, in a semi-fluid form, and of a specific gravity varying as to the use for which the product is designed, say, from 1.300 up to the highest point of concentration, to form a plastic mass. These materials to be mixed by hand, or appropriate machinery. The proportions in the general way to be about one part of soluble silicate to six or eight parts of sand, clay, gravel, &c. A small quantity of fine hydrate of lime or common slaked lime, or carbonate of lime, or any insoluble substance, as finely-pulverized quartz, may be mixed with the compound, that every crevice or interstice may be effectually filled. The mass is then pressed into moulds of any desired form, said moulds being made of plaster of Paris, wood, iron, or other suitable material.

After the mass is removed from the moulds, it is to be treated with a solution of nitrate of lime, either in a cold or hot state, as may be desired, and either by washing or in a bath of said salt, as desired, when chemical interchange, by virtue of chemical affinities, takes place, the nitric acid of the soluble nitrate of lime, having a greater affinity for the potassa or soda than for the lime, unites with the potassa or soda, forming the nitrate of potassa or soda, and the lime left free unites with the silicic acid, forming the insoluble silicate of lime, which is the cementing property throughout the stone.

The nitrates of potassa or soda, being both soluble salts, are easily removed from the stone by means of warm or hot water, they being washed out in solution, and the stone, thus freed from salt, has only to be dried to be ready for use.

When the original bath of nitrate of lime refuses to work longer, and it may be used until well-nigh exhausted of lime, it is to be treated with carbonate of potassa or carbonate of soda, to precipitate any lime remaining in the solution, when the fluid remaining, together with the washings of the stone, likewise so treated, is to be evaporated to a chrystallizable point, when nitrate of potassa or saltpetre or nitrate of soda will form.

These salts, being of considerable commercial value, and the quantity economized in the large scale of manufacture being large, can be either sold in the market, or used as a source of nitric acid, to form the nitrate of lime, and thus a continuous supply of nitric acid can be kept-up, and in either case, by sale or reuse, the cost of the stone will thereby be reduced very low.

The stone thus formed will withstand all the usual atmospheric tests, and is not disintegrated by frosts nor dissolved by the acids in common use, and may, by using an exhaust during the indurating process, be made as hard as granite.

For damp or very exposed situations, the surface of the stone thus made might be advantageously coated, first, with a soluble silicate, and then brushed with the nitrate of lime, that the silicate of lime may be deposited in all the surface-pores, and, after again being washed well, will be well-nigh impervious to water.

I am well aware that silicates of potassa and soda have been used with two other salts of lime, viz, chlorate of calcium and saccharate of lime, to form artificial stone. Such a composition forms no part whatever of my invention, but the use of the nitrate of lime, in the way described, by which it is economized and utilized, as set forth, forming either a continuous process of manufacture of nitrate of lime, or the nitrates of potash and soda.

This nitrate of lime has never, to my knowledge, been used or claimed for this purpose, its first cost being so expensive as to preclude entirely its use, but my method, by which the nitric acid is recovered, as set forth, and by which the cost of production of stone is very much lowered, I regard as entirely new.

By my process a much better and more reliable stone is produced than by any other method now known, for the resulting nitrate formed in the body of the stone, is so much more soluble than the salt formed by any other process of manufacture now known, that it is much more readily washed out, whereas there exists an objection to forms of artificial stone, because of the clogging of the pores of the stone by a salt not so readily or entirely yielding to the soluble action of water, which salt, remaining in the stone, renders it almost worthless. This objection is entirely met by my method, and, further, the discoloration of the surfaces of stone made by other methods, by efflorescence, &c., caused by undecomposed salt, or salt not washed out, does not take place in stone made by my method.

What I claim as my discovery, and desire to secure by Letters Patent, is—

1. The herein-described improvement in artificial stone, by which an insoluble silicate of lime is formed, by the double decomposition of the silicates of potassa or soda and nitrate of lime, substantially as herein set forth.

2. The herein-described method of forming artificial stone, by the use of an alkaline silicate and nitrate of lime, when the latter salt is recovered and the washings treated in the manner described, so as to utilize the acid element or recover the nitrates for the market.

3. The utilization of all the salts left in the residual liquors, as herein described, whereby a continuous formation of nitrate of potassa or soda is kept up.

In testimony whereof, I have signed my name to this specification before two subscribing witnesses.

WM. K. BOYLE.

Witnesses:

EDM. F. BROWN,

D. P. HOLLOWAY.